Figure 1:
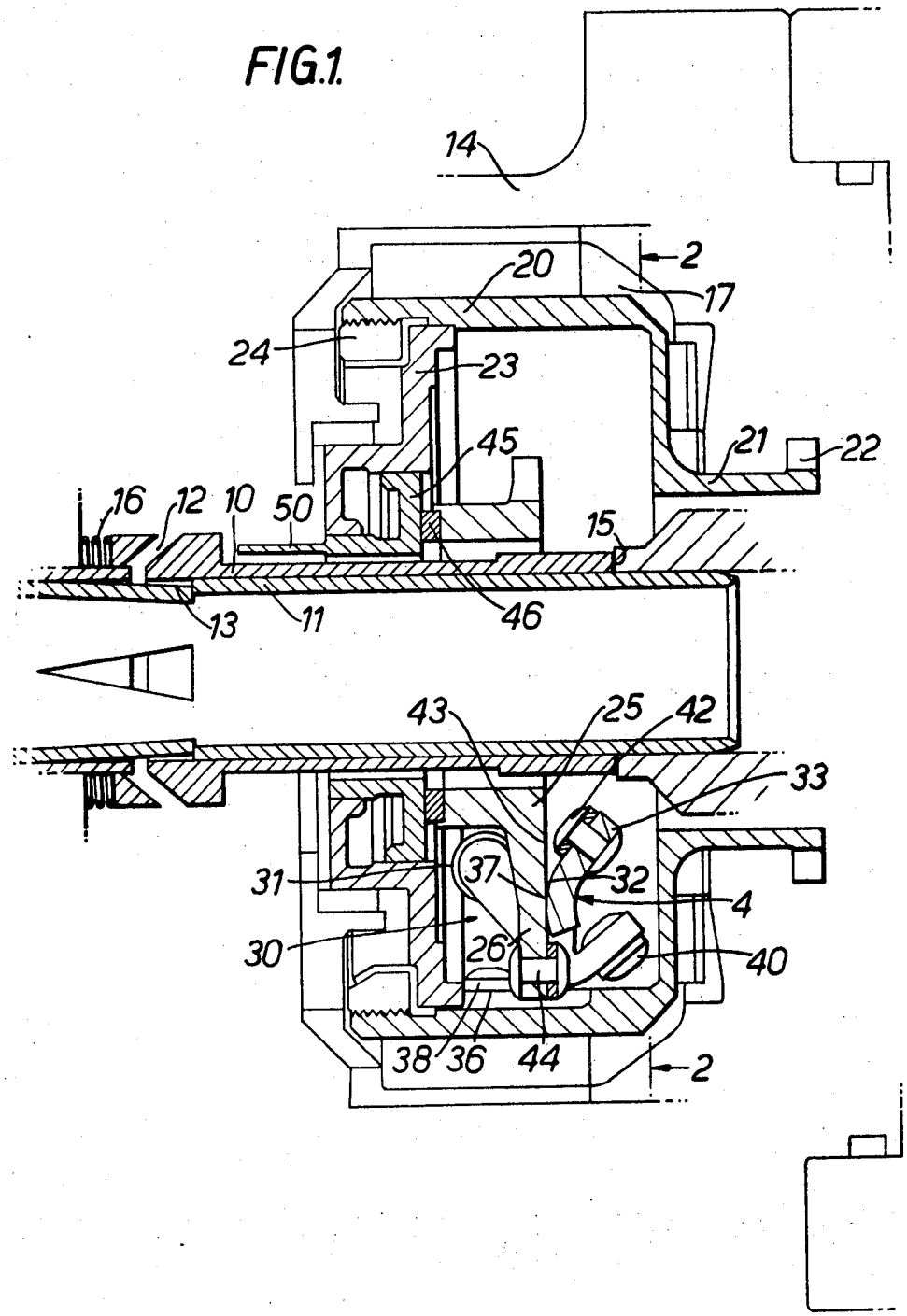

United States Patent [19]
Johnson et al.

[11] 3,713,344
[45] Jan. 30, 1973

[54] CENTRIFUGAL GOVERNOR

[75] Inventors: Christopher Linley Johnson, Hartshorne, near Burton-on-Trent; John Robert William Whitmarsh; Kenneth Arnold Basford, both of Derby, all of England

[73] Assignee: Secretary of State for Defence, London, England

[22] Filed: Nov. 13, 1970

[21] Appl. No.: 89,395

[30] Foreign Application Priority Data

Nov. 17, 1969 Great Britain.....................56,192/69

[52] U.S. Cl........................................73/546, 73/551
[51] Int. Cl..............................................G05d 13/14
[58] Field of Search.........73/534, 546, 550, 551, 535

[56] References Cited

UNITED STATES PATENTS 1,464,749  8/1923  Dahlstrand.........................73/546 X

FOREIGN PATENTS OR APPLICATIONS 163,713  10/1905  Germany..............................73/551
408,694  1/1925  Germany..............................73/535

Primary Examiner—James J. Gill
Attorney—Cushman, Darby & Cushman

[57] ABSTRACT

The invention concerns a centrifugal governor comprising a rotatable driving member, a plurality of equiangularly spaced apart flyweights which have driving connections with the said driving member so as to be rotated by the latter, at least portions of the flyweights being movable radially outwardly under centrifugal force, a rotatable and axially movable driven member having driving connections with the flyweights so as to be rotated thereby and so as to be moved axially thereby in a given axial direction when the flyweights move radially outwardly, the driving and driven members being coaxial, and means for urging the driven member in the opposite axial direction, all the said driving connections comprising relatively non-slidable parts which roll over each other during axial movement of the driven member in the said given axial direction.

4 Claims, 5 Drawing Figures

PATENTED JAN 30 1973 3,713,344

SHEET 2 OF 3

CENTRIFUGAL GOVERNOR

This invention concerns centrifugal governor, e.g., for use is controlling fuel flow through a fuel control system of a gas turbine engine.

According to the present invention, there is provided a centrifugal governor comprising a rotatable driving member, a plurality of equi-angularly spaced apart flyweights which have driving connections with the said driving member so as to be rotated by the latter, the flyweights, or portions thereof, being movable radially outwardly under centrifugal force, a rotatable and axially movable driven member having driving connections with the flyweights so as to be rotated thereby and so as to be moved axially thereby in a given axial direction when the flyweights move radially outwardly, the driving and driven members being coaxial, and means for urging the driven member or a part positioned thereby, in the opposite axial direction, all the said driving connections comprising relatively non-slidable parts which roll over each other during axial movement of the driven member in the said given axial direction.

Since the said parts of the driving connections are relatively non-slidable and roll over each other as aforesaid, the hysteresis which would otherwise be apparent in the characteristic of the governor, as a result of the friction between the flyweights and the driving and driven members, is substantially avoided.

Each flyweight is preferably drivingly connected to both the driving and driven members by flexible strips, each flexible strip extending over and being disposed between a curved surface of the flyweight and a cooperating surface of the respective said member, radial movement of each flyweight under centrifugal force causing each curved surface to roll over the respective cooperating surface with the respective flexible strip interposed therebetween.

The said cooperating surfaces on the driving and driven members may be planar and respectively normal to each other, the cooperating surfaces on the driven member being normal to the axis of the latter, the curved surfaces of the flyweights which roll over the cooperating surfaces on the driven member having a circular cross-section, and the curved surfaces of the flyweights which roll over the cooperating surfaces on the driving member having an involute cross-section whose base or generating circle is coincident with the surface of the circular cross-section.

The driving member is preferably a casing which is mounted concentrically about the driven member and which is provided internally with the respective cooperating surfaces, means being provided for limiting relative non-axial movement between the casing and driven member.

The driven member may have a plurality of equi-angularly spaced apart radial arms, one for each flyweight, the radially outermost portion of each radial arm being mounted within a respective slot in the said casing to permit only limited radial and circumferential movement.

Each flyweight may be drivingly connected to the casing by two flexible strips which are respectively disposed on opposite sides of the respective radial arm.

The driven member may be an operating sleeve within which are mounted two concentric apertured sleeves the apertures in which control a liquid flow, the outer apertured sleeve being axially adjustable by the operating sleeve to vary the degree of registration of the apertures in the apertured sleeves and thus to control said flow.

The governor may be mounted within a housing adapted to be filled with said liquid, means being provided for compensating for changes in the specific gravity of said liquid.

Figure 2:
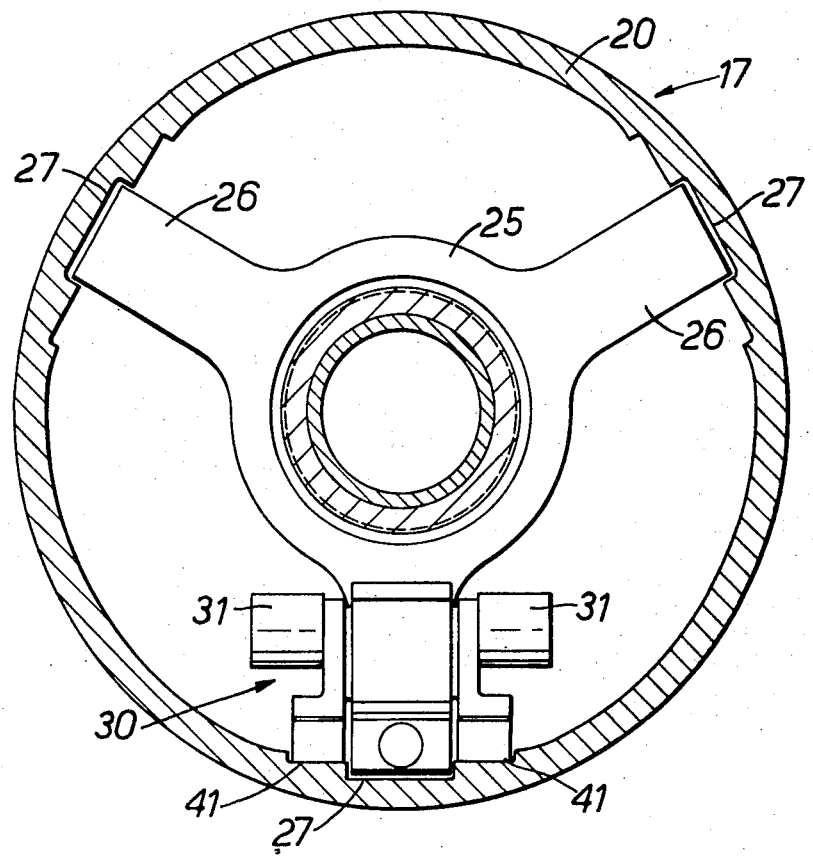
Figure 4:
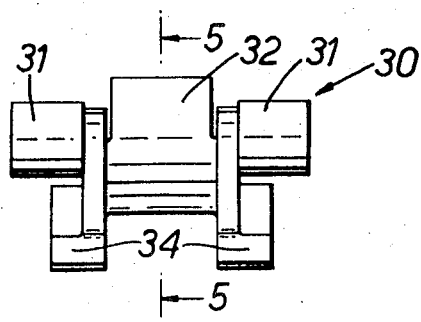
Figure 5:
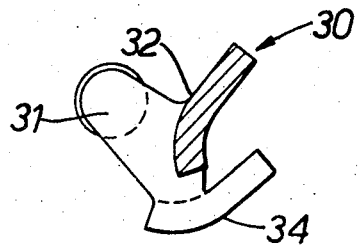
Figure 3:
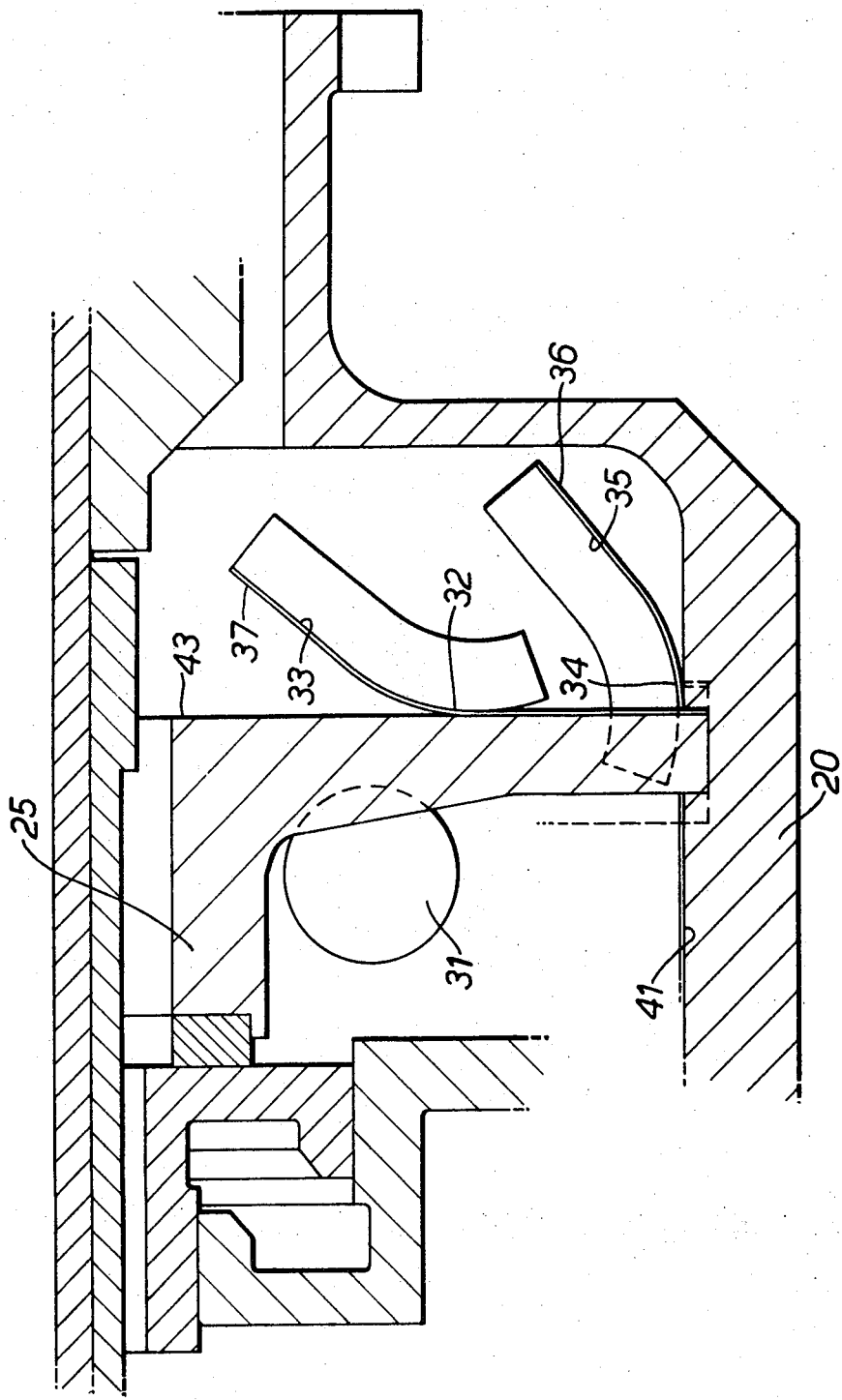

The invention is illustrated, merely by way of example, in the accompanying drawings, in which:

FIG. 1 is a sectional view of a centrifugal governor according to the present invention, FIG. 2 is a section taken on the line 2—2 of FIG. 1, FIG. 3 is a diagrammatic section showing part of the structure of FIG. 1 on a larger scale, FIG. 4 is an elevation looking in the direction of arrow 4 of FIG. 1, and FIG. 5 is a sectional view taken on the line 5—5 of FIG. 4.

The terms "left" and "right" as used in the description below, are to be understood to refer to directions as seen in the accompanying drawings.

A gas turbine engine fuel control system includes axially movable, outer and inner apertured sleeves 10, 11, having apertures 12, 13 respectively which are relatively movable axially into increased and reduced communication with each other on relative axial movement of the apertured sleeves 10, 11. The apertured sleeves 10, 11 are mounted within a housing 14 which is filled with liquid fuel, the apertures 12, 13 serving to meter a flow of this fuel within the housing 14.

The inner sleeve 11 is rotated (by means not shown), the outer apertured sleeve 10 being non-rotatable. The relative rotation between the apertured sleeves 10, 11 reduces the risk of stiction between them, and thus renders it easier to control the said fuel flow by axial adjustment of the outer apertured sleeve 10.

The apertured sleeve 10 is urged towards the right and towards contact with an abutment 15 by means of a spring shown diagrammatically at 16. The spring 16 thus urges the apertured sleeve 10 is a direction to maximize flow through the apertures 12, 13. The apertured sleeve 10, is, however, movable towards the left by means of a centrifugal governor 17 which is mounted within the housing 14.

The centrifugal governor 17 comprises a rotatable, but axially fixed, casing 20 which constitutes a driving member of the centrifugal governor and which is formed integrally at its right hand end with a stub shaft 21. The stub shaft 21 is provided with a gear wheel 22 by means of which the casing 20 is driven (by means not shown). Mounted within and adjacent to the left hand end of the casing 20 is an end plate 23 which is secured within the casing 20, by means of a ring nut 24.

The casing 20 is mounted concentrically about a rotatable and axially movable operating sleeve 25 which constitutes the driven member of the centrifugal governor 17. The operating sleeve 25 is provided with three equi-angularly spaced apart radial arms 26. The radially outermost portion of each of the radial arms 26 is mounted for limited radial and circumferential movement within a respective slot 27 (FIG. 2) in the casing 20. Non-axial movement between the casing 20 and the operating sleeve 25 is thus limited. Each of the radial arms 26 has a flyweight 30 associated therewith.

Each of the flyweights 30 is provided with two heavy portions 31, and with a curved surface 32 (FIG. 3) which merges into a planar surface 33. The curved surface 32 has a circular cross-section.

Each of the flyweights 30 is also provided with two curved surfaces 34 each of which merges into a planar surface 35, the curved surfaces 34 being respectively disposed on opposite sides of the curved surface 32. The curved surfaces 34 have an involute cross-section whose base or generating circle is coincident with the surface of the circular cross section of the curved surface 32. Alternatively, the curved surfaces 32 could be formed to a curve other than a circle, in which case the curved surfaces 34 should be formed to an involute of said non-circular curve.

Each of the flyweights 30 is drivingly connected to the casing 20 by two flexible spring steel strips 36 which are respectively disposed on opposite sides of the respective radial arm 26, while each flyweight 30 is drivingly connected to the operating sleeve 25 by a single flexible strip 37.

Each of the flexible strips 36 is riveted, by a rivet 40, to the planar surfaces 35, each flexible strip 36 extending over a curved surface 34 and over a planar surface 41 provided internally of and out into the casing 20. As will be seen from FIG. 2, there are a pair of parallel, planar surfaces 41 disposed on opposite sides of each slot 27, the planar surfaces 41 facing radially inwardly and acting as cooperating surfaces over which the surfaces 34 may roll with the flexible strip 36 interposed therebetween. Each of the flexible strips 36 is riveted to the respective planar surface 41 by a rivet 38.

Each of the flexible strips 37, which is riveted by a rivet 42 to the respective planar surface 33, extends over the respective curved surface 32 and is riveted to the radially outer part of a planar surface 43 of the respective radial arm 26 by a rivet 44. The planar surface 43 of each radial arm 26 is normal both to the axis of the operating sleeve 25 and to the planar surfaces 41. The curved surfaces 32 are adapted to roll over the planar surfaces 43 with the flexible strips 37 interposed therebetween.

Each flyweight 30 is movable radially outwardly as a whole under centrifugal force and is also rotatable by reason of radially outward movement of the heavy portions 31 under centrifugal force. Under such centrifugal force the curved surfaces 32, 34 will thus roll over the cooperating surfaces 41, 43 with the flexible strips 36, 37 interposed therebetween and no hysteresis-producing sliding movement will occur between these parts.

Accordingly, in operation, when the casing 20 is rotated, movement is initially imparted to each flyweight 30 by way of the flexible strips 36 and is also imparted therefrom to the operating sleeve 25 by way of the flexible strips 37. Centrifugal forces will, however, cause the heavy portions 31 to move radially outwardly, and this will cause the surfaces 32 to roll over the planar surfaces 43, and will also cause the surfaces 34 to roll over the surfaces 41. This in turn will cause the operating sleeve 25 to move towards the left. The centrifugal forces, moreover, force the surfaces 34 towards the surfaces 41 and force the surfaces 32 towards the surface 43, so that, in addition to drive being transmitted through the flexible strips 36, 37, it is also transmitted frictionally.

Normally, there will, of course, be a clearance between the radial arms 26 and the slots 27 in the casing 20. However, if distortion or breakage of a flexible strip 36, 37 occurs, a snubbing action will be effected between the radial arms 26 and the casing 20 to prevent relative angular movement. Thus, for example, during start-up, the forces required to accelerate the flyweights 30 and the operating sleeve 25 may exceed the load that can be carried by friction so that, but for this snubbing action, the flexible strips 36, 37 would be badly distorted. Again this snubbing action provides a fail-safe feature if the strips 36, 37 should break, since if this should occur the operating sleeve 25 will still be located in approximately the correct position.

The operating sleeve 25 is arranged to transmit axial movement to an axially movable sleeve 45 by way of a carbon thrust bearing 46, the sleeve 45 being axially slidable within the end plate 23. The sleeve 45 has a dogged connection 50 to the apertured sleeve 10. The sleeves 10, 45 are axially movable together but are prevented from rotation by a guide piece (not shown) on the apertured sleeve 10, the guide piece engaging a part of the housing 14. Axial movement of the apertured sleeve 10 towards the left reduces the degree of registration of the apertures 12, 13, whereby to reduce the fuel flow.

In the centrifugal governor shown in the drawings, the force produced by the governor is independent of governor position and is dependent only upon the square of the speed of rotation. However, as will be appreciated, it is possible to design the centrifugal governor of the present invention so as to provide other governor characteristics.

The flyweights 30 are immersed in fuel within the housing 14 and thus the effect of centrifugal forces on them will depend upon the specific gravity of the fuel present. Each flyweight may therefore, if desired, be provided with a counterweight (not shown) made of a light material such that the centrifugal forces acting upon it are also dependent upon the specific gravity of the fuel present, but act in the opposite direction to the centrifugal forces acting on the heavy portions 31. Thus the specific gravity of the fuel, and hence its temperature, would have substantially no effect upon the operation of the governor.

We claim:

1. A centrifugal governor comprising: a rotatable driving member having planar surfaces thereon; a rotatable and axially movable driven member mounted coaxially with respect to said driving member and having planar surfaces thereon, said planar surfaces of said driving member being normal to the planar surfaces of said driven member and said planar surfaces of said driven member being normal to the driven member's axis; means for urging said driven member in a predetermined axial direction; and a plurality of equiangularly spaced apart flyweights, each of said flyweights being drivingly connected to both said driving and driven members by flexible strips, each flexible strip extending over and being disposed between a curved surface of the flyweight and cooperating with one of the planar surfaces of said respective driving and driven members, said flyweights being movable by centifugal force radially outwardly and causing each curved surface to roll over the respective planar surface with the respective flexible strip interposed therebetween to thereby move said driven member axially against said urging means, the curved surfaces of the flyweights which roll over said planar surfaces on said driven member having a circular cross section and the curved surfaces of said flyweights which roll over the planar surfaces of said driving member having an involute cross section whose pitch circle is of the same radius as that of said circular cross section.

2. A governor as claimed in claim 1 in which the driving member is a casing which is mounted concentrically about the driven member and which is provided internally with its respective planar surfaces, means being provided for limiting relative non-axial movement between the casing and driven member.

3. A governor as claimed in claim 2 in which the driven member has a plurality of equi-angularly spaced apart radial arms, one for each flyweight, the radially outermost portion of each radial arm being mounted within a respective slot in the said casing to permit only limited radial and circumferential movement.

4. A governor as claimed in claim 3 in which each flyweight is drivingly connected to the casing by two flexible strips which are respectively disposed on opposite sides of the respective radial arm.

* * * * *